April 6, 1965 C. P. LAMB Re. 25,760

GAS LIFT VALVE

Original Filed July 12, 1961 2 Sheets-Sheet 1

Charles P. Lamb
INVENTOR.
BY J. Vincent Martin
Joe E Edwards
M H Gay

GAS LIFT VALVE

Original Filed July 12, 1961 2 Sheets-Sheet 2

Charles P. Lamb
INVENTOR.
BY J. Vincent Martin
Joe E Edwards
M H Gay

United States Patent Office

Re. 25,760
Reissued Apr. 6, 1965

25,760
GAS LIFT VALVE

Charles P. Lamb, Dallas, Tex., assignor to Merla Tool Corporation, Dallas, Tex., a corporation of Texas Original No. 3,092,131, dated June 4, 1963, Ser. No. 123,473, July 12, 1961. Application for reissue Aug. 26, 1963, Ser. No. 305,032
4 Claims. (Cl. 137—155)

Matter enclosed in heavy brackets [ ] appears in the original patent but forms no part of this reissue specification; matter printed in italics indicates the additions made by reissue.

This invention relates to valves and more particularly to gas lift valves.

An object of this invention is to provide a [wireline] gas lift valve having a pilot valve controlled motor piston which opens the main valve when pressure thereacross is unbalanced and in which pilot gas is exhausted through the main valve seat and the bleed passage commonly associated with pilot operated gas lift valves is upstream of the pilot valve seat.

Another object is to provide a [wireline] gas lift valve as in the preceding object in which the main valve member is characterized by snap action in moving to both open and closed positions.

Another object is to provide a gas lift valve as in the preceding object wherein a full open valve seat is provided when the main valve member is in open position.

Other objects, features and advantages of the invention will be apparent from the drawings, the specification and the claims.

In the drawings, wherein an illustrative embodiment of this invention is shown, and wherein like reference numerals indicate like parts:

Figure 2:
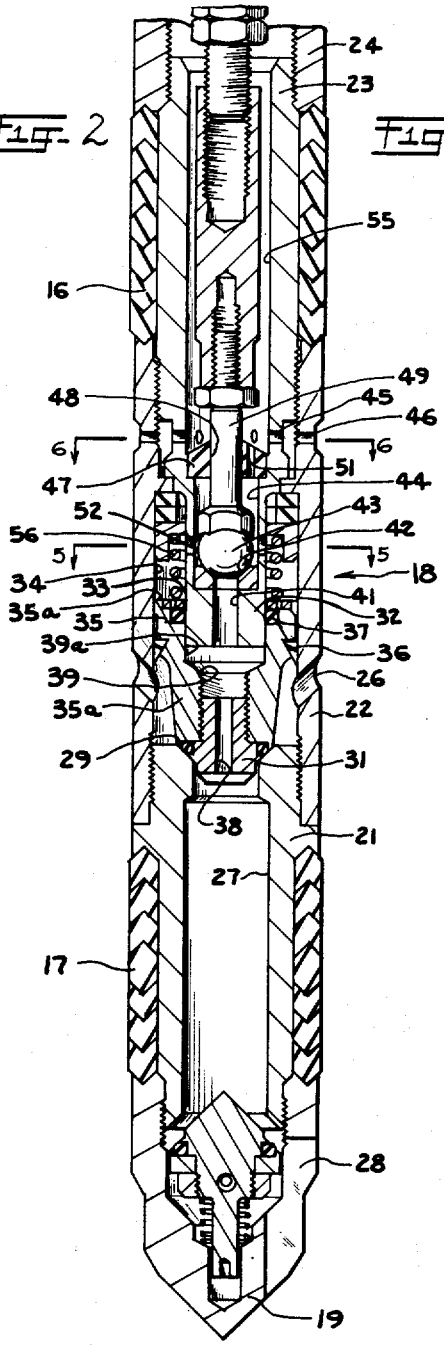
FIGURE 2 is a view in vertical cross section through the lower portion of the valve shown in FIGURE 1.
Figure 1:
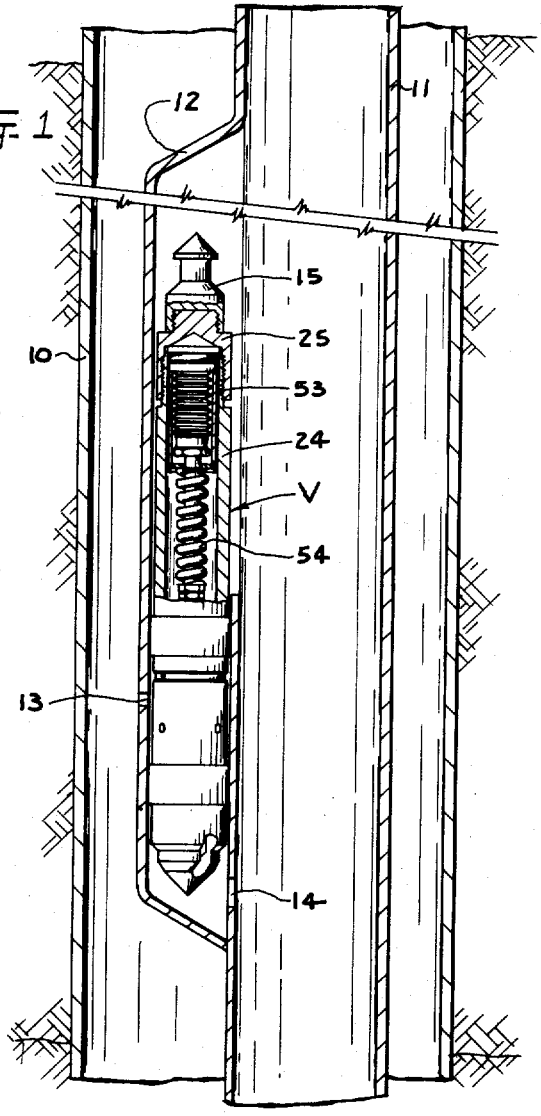
FIGURE 1 is a view in section through a well casing and tubing and showing a valve constructed in accordance with this invention in the side pocket of the tubing, said valve being shown partly in elevation and partly in cross section.
Figure 3:
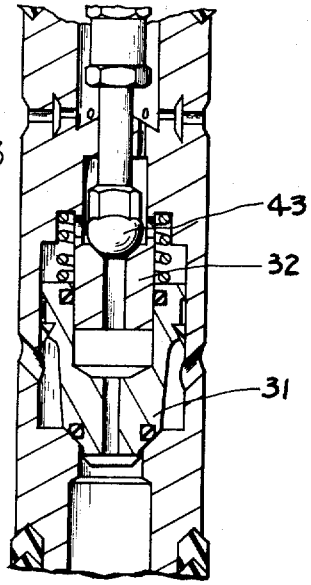
FIGURE 3 is a schematic view showing the main and pilot valve in closed position.
Figure 4:
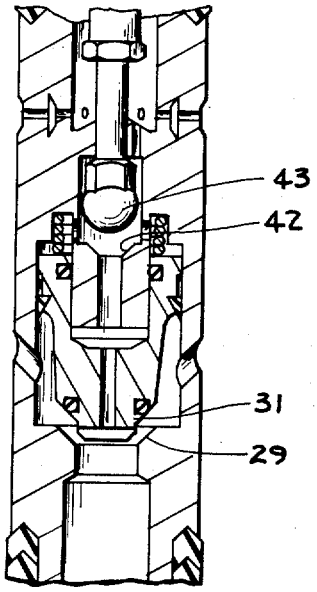
Figure 5:
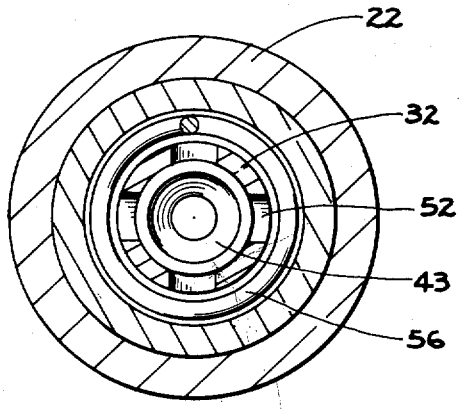
Figure 6:
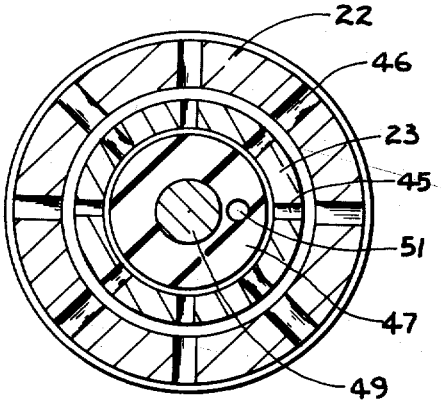

FIGURE 4 is a view similar to FIGURE 3 showing the main and pilot valves in open position; and FIGURES 5 and 6 are view along the lines 5 and 6 of FIGURE 2, respectively.

In the drawing the numeral 10 indicates a section of a well casing. Positioned within the well casing is a tubing 11 having an off-set or side pocket portion 12 in which a wireline gas lift valve such as the valve V may be landed in the conventional manner. The side pocket 12 had a fluid inlet 13 therein for conducing fluid from the tubing casing annulus into the side pocket 12. An outlet 14 is provided between the side pocket and the tubing wall proper to conduct fluid passing through the valve V to the interior of the tubing 14.

The valve V is provided with the usual fishing neck 15 at its upper end whereby a wireline may be connected to the valve to run it into position or remove it from the tubing.

The valve V is provided with spaced packing 16 and 17 which seal between the valve and the side pocket 12 to define an intermediate section of the valve V indicated generally at 18.

The valve V includes a housing which is formed of several sections which are threaded or otherwise secured to each other. Beginning at the lower end of the valve the bottom cap 19 is secured to the back check adapter 21 immediately thereabove. The back check adapter is in turn secured to the piston housing 22 which is in turn secured to the pilot adapter 23. Above the pilot adapter 23 a bellows and spring housing 24 is provide which is closed at its upper end by a top cap 25.

The lower outer seal 17 is carried about the adapter 21 and the upper seal 16 is carried about the pilot adapter 23.

A main gas passageway is provided through the housing. This main gas passageway has its inlet 26 in the intermediate portion of the valve 18 defined by the upper and lower seals. The main gas passageway also includes the bore 27 through the adapter 21 and the outlet of the main gas passageway is provided at 28 in the lower cap.

A valve seat 29 is provided at the upper end of adapter 21 and surrounds the main gas passageway.

A main valve member 31 cooperates with the main valve seat and controls flow through the main gas passageway.

Above the main valve member a boss 32 is provided which is carried by the housing. It will be noted that the boss 32 is a lower extension of the pilot adapter 23. The boss 32 has an outer cylindrical surface 33 which is concentric with the bore 34 through the tubular housing to provide an annulus between the boss and bore.

A motor piston 35 for controlling movement of the main valve member is provided in said annulus and has a sliding seal with the housing provided by annular seal member 36 and a sliding seal with the boss provided by O-ring 37.

The lower face of the piston 35 is exposed to the main gas inlet 26 for purposes which will appear hereinafter.

Means are provided for connecting the motor piston 35 and the main valve 31 together and may be provided by a lower extension 35a on the motor piston 35.

In order to provide for fluid communication through the valve member and motor piston, a passageway is provided by bores 38 and 39. The bore 39 has a counterbore section 39a which is in sliding engagement with the outer cylindrical surface 33 of boss 32.

In order to permit fluid to pass through the piston and main valve, the boss 32 has a bore 41 therethrough which communicates with the passageway in the motor piston For purposes of controlling flow through the boss 32 the upper end of passageway 41 is provided with a pilot valve seat 42 with which a pilot valve member 43 co operates to control flow through the pilot valve seat.

A pilot gas passageway is provided between the pilot valve seat and the intermediate section of the housing This passageway includes a bore 44 in the boss, lateral ports 45 in pilot adapter 23 and lateral ports 46 in the piston housing 22.

The upper end of bore 44 is sealed by seal member 47. This seal member has a bore 48 therethrough in which the valve stem 49 of the pilot valve member 43 is mounted for reciprocation.

A bleed passage is provided in the pilot gas passageway between the inlet ports 46 and the pilot seat 42 by a small passage 51 in seal 47. As will latter appear, this bleed passage provides a pressure drop thereacross when the pilot valve member is in open position.

In order to establish fluid communication between the pilot gas passageway and the upper endwise face 35a of piston 35, a plurality of ports 52 are provided in boss 32 and establish communication between the exterior of the boss and the bore 44 therein. It will be noted that these ports are located between the pilot valve seat 42 and the bleed section 51.

Connected to the pilot valve stem 49 is a pressure responsive motor means for moving the pilot valve member between upon and closed position. This motor means may include the bellows 53 and a spring 54. The motor means is exposed to the pressure within the casing tubing annulus. This pressure reaches the motor means by passing from the pilot gas inlet 46 upwardly through the ore 55 in pilot adapter 23 to the bellows housing 24.

In operation it will be assumed that the valve is set o have a closing pressure of 550 p.s.i. and an opening ressure of 600 p.s.i.

As the casing pressure builds up to 600 p.s.i., its effect n the effective area of the pilot bellows overcomes the pring force and the pilot valve member 43 is moved to pen position. Since the bleed 51 is located upstream f the pilot valve seat, the casing pressure that was preiously effective on the upper endwise face 35a of the iotor piston 35 is discharged through the open pilot valve eat 42. The discharge pressure passes through the motor iston 35 and main valve 31 and is discharged through ie main gas outlet 28. The pressure in the housing elow the seal 47 and above the motor piston is thus reuced to tubing pressure as the pressure fluid therein is ischarged. Of course, the bleed 51 is sized such that ie pressure on the upper face of motor piston 35 [*can*] be ischarged through the main valve member faster than it omes through the bleed 51.

The dissipation of casing pressure from the chamber ove the motor piston 35 causes an unbalancing of the orces acting upon the motor piston 35 since the underde of the motor piston is exposed to casing pressure irough the main gas passageway inlet 26. Upon this unalancing of the forces, the main valve member snaps to pen position and allows the lift gas to pass through the ain passageway through the main valve seat 29 and it the main gas outlet 28 into the tubing string to lift ie oil therein to the surface.

In the closing cycle the casing pressure is lowered to 50 p.s.i., at which time the effect of the casing pressure pon the effective area of the pilot bellows is overcome y the spring force thus allowing the pilot valve to close. Then the pilot valve 43 closes, it allows the pressure the chamber below the bleed 51 and above the pilot ilve seat to equalize with casing pressure, thus balancing ie forces acting across the motor piston. At this time e spring 56 which acts upon the endwise face 35a of otor piston 35 starts the main valve toward closed posion. When the main valve nose starts into the main ilve port, the flow of lift gas past the main valve snaps e main valve onto its seat where it is retained by casing essure until the next time the pilot valve opens. While e spring 56 is desired, it is not essential, as the flow of t gas past the main valve will tend to move it towards osed position. The use of the spring provides a more ositive action, however, and it is preferred.

The foregoing disclosure and description of the invenon is illustrative and explanatory thereof and various anges in the size, shape and materials, as well as in e details of the illustrated construction, may be made thin the scope of the appended claims without departg from the spirit of the invention.

What is claimed is:

1. A gas lift valve comprising, a tubular housing, spaced al means on the exterior of the housing defining theretween an intermediate section of the housing, a main s passageway through the housing having an inlet in id intermediate section and an outlet outside said interediate section, a valve seat in said main gas passageway, main valve member cooperable with the valve seat to ntrol flow through the passageway, a boss carried by the using and having an outer cylindrical surface concenc with the bore in said housing to provide an annulus erebetween, a motor piston in said annulus sealingly gaging said housing and cylindrical surface and having e endwise face exposed to said inlet, means connecting id valve member and piston together, a passageway exding through said valve member and piston and concting means, a passageway extending through said boss and in fluid communication with the passageway through said piston, a pilot valve seat in said boss passageway, a pilot valve member cooperable with said pilot valve seat to control flow therethrough, a pilot gas passageway between said pilot valve seat and said intermediate section of the housing, said pilot gas passageway having a bleed section providing a pressure drop thereacross when the pilot valve member is in open position, means establishing fluid communication between the other endwise face of said piston and said pilot gas passageway between said bleed section and said pilot valve seat, and pressure responsive motor means for moving said pilot valve member between open and closed positions.

2. The valve of claim 1 wherein the boss has a bore on the side of the pilot valve seat remote from the boss passageway forming a part of the pilot gas passageway, a seal is provided across said bore with a small opening therethrough to provide said bleed section of the pilot gas passageway, and port means in the boss opens into the bore and provides means for establishing communication between the pilot gas passageway and said piston.

3. The valve of claim 1 wherein the boss has a bore on the side of the pilot valve seat remote from the boss passageway forming a part of the pilot gas passageway, a seal is provided across said bore with a small opening therethrough to provide said bleed section of the pilot gas passageway, port means in the boss opens into the bore and provides means for establishing communication between the pilot gas pasageway and said piston, and a connecting stem extends through said seal and interconnects said motor means and said pilot valve member.

*4. A gas lift valve comprising, a tubular housing, a main gas passageway through the housing, a valve seat in said main gas passageway, a main valve member cooperable with the valve seat to control flow through the passageway, a boss carried by the housing and having an outer cylindrical surface concentric with the bore in said housing to provide an annulus therebetween, a motor piston in said annulus sealingly engaging said housing and cylindrical surface and having one endwise face exposed to said inlet, means connecting said valve member and piston together, a passageway extending through said valve member and piston and connecting means, a passageway extending through said boss and in fluid communication with the passageway through said piston, a pilot valve seat in said boss passageway, a pilot valve member cooperable with said pilot valve seat to control flow therethrough, a pilot gas passageway between said pilot valve seat and the exterior of the housing, said pilot gas passageway having a bleed section providing a pressure drop thereacross when the pilot valve member is in open position, means establishing fluid communication between the other endwise face of said piston and said pilot gas passageway between said bleed section and said pilot valve seat, and pressure responsive motor means for moving said pilot valve member between open and closed positions.*

References Cited by the Examiner

The following references, cited by the Examiner, are of record in the patented file of this patent or the original patent.

UNITED STATES PATENTS

| | | | |
|---|---|---|---|
| 2,446,680 | 8/48 | Walton | 103—232 |
| 2,619,111 | 11/52 | Renick | 137—489 |
| 2,994,335 | 8/61 | Dudley | 137—155 |

WILLIAM F. O'DEA, *Primary Examiner.*

ISADOR WEIL, *Examiner.*